Patented Dec. 15, 1925.

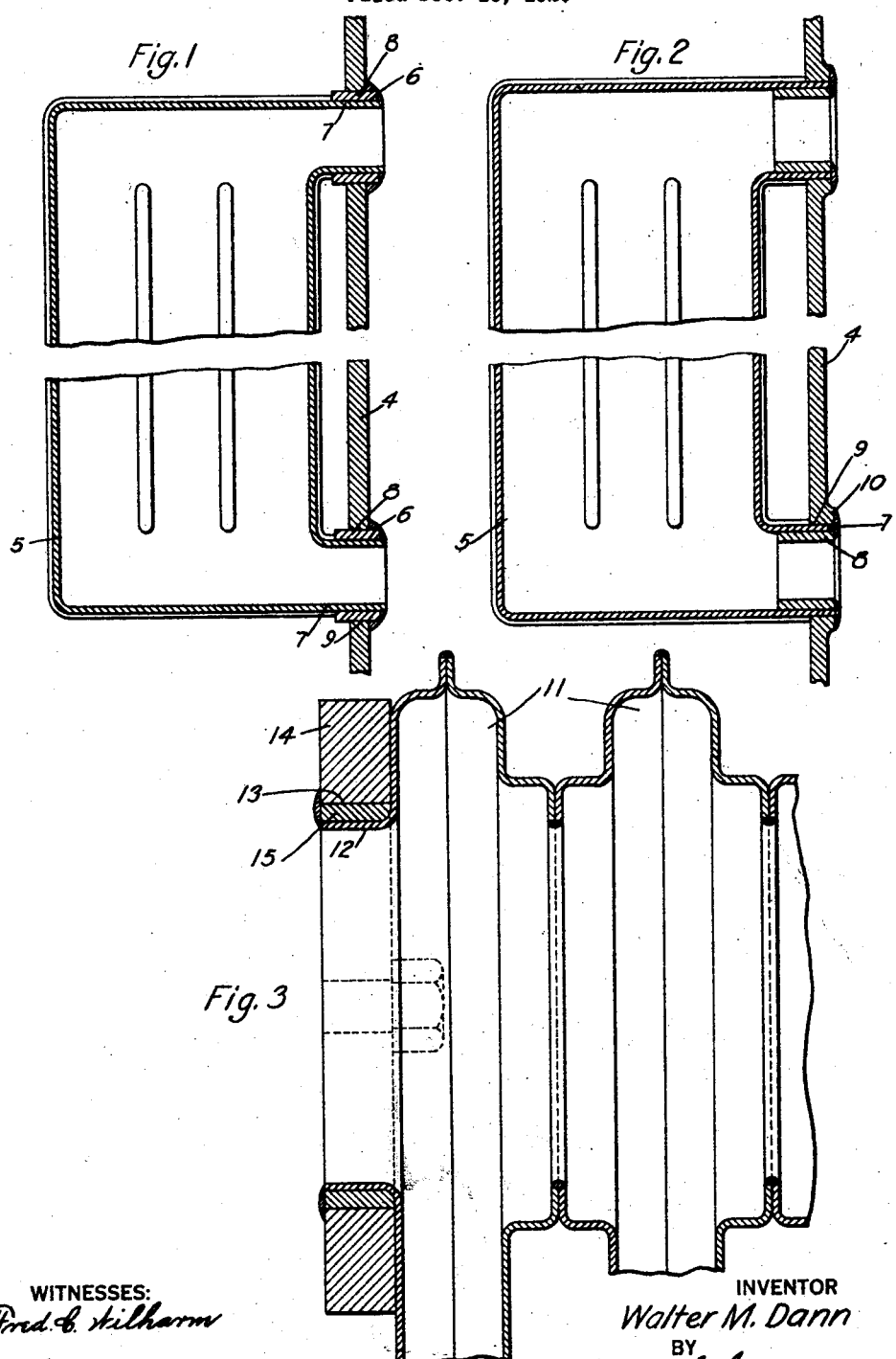

1,565,424

UNITED STATES PATENT OFFICE.

WALTER M. DANN, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSFORMER RADIATOR.

Application filed December 16, 1920. Serial No. 431,105.

*To all whom it may concern:*

Be it known that I, WALTER M. DANN, a citizen of the United States, and a resident of Wilkinsburg, in the county of Allegheny and State of Pennsylvania, have invented a new and useful Improvement in Transformer Radiators, of which the following is a specification.

My invention relates to the art of welding metals and it has particular relation to welded joints between two members of different thicknesses, and to methods of making such joints.

The object of my invention is to provide a welded joint, whereby members of any thickness may be successfully welded to members of different thicknesses without burning away, or in any manner injuring, either of the members being welded.

Briefly speaking, my invention comprises reinforcing the thinner of the members to be welded in such manner as to render it of substantially the same thickness as the member to which it is to be welded.

Heretofore, it has been customary, when welding a member of relatively thin cross-section to a member of relatively thick cross-section, to cut a groove in the thicker member, leaving a flange or edge adjacent to said thin member of substantially the same thickness as said thin member. By so doing, the two members to be welded together are rendered sustantially equal in thickness. The difficulty in welding a thin member and a relatively thick member is that the latter conducts away heat at a much greater rate than does the former, thus permitting the former member to reach a much higher degree of temperature than does the latter, even though exposed to the same temperature. This results in burning away the thinner member.

While my invention relates generally to welded joints, it relates specifically to means whereby a pressed metal fluid containing, air-cooled radiator may be attached to a tank or other suitable container or to a coupling member, which, in turn, is attached to the tank.

In the accompanying drawing,

Figure 1 is a cross-sectional view of a portion of a transformer tank having a radiator unit mounted thereon and welded thereto by means of a connection embodying my invention.

Fig. 2 is a cross-sectional view somewhat similar to that shown in Fig. 1, illustrating another slightly different form of my invention.

Fig. 3 is a cross-sectional view of several radiator units, the innermost of which has a coupling member attached thereto by means of a welded joint constructed in accordance with my invention.

In Fig. 1 of the drawing, I show a portion of a transformer tank 4 upon which is mounted a radiator unit 5 by means of two similar welded connections 6. The welded connection is made by first reinforcing offset tubular portions 7 of the radiator unit 5 with an annular sleeve 8 composed of substantially the same material as is the radiator unit 5. The combined thicknesses of the material of the tube 7 and that of the sleeve 8, which is substantially of the same thickness as the tank wall 4, is then inserted in an opening 9 in the tank wall 4. The sleeve 8, the tube 7, and the adjacent portion of the tank wall 4 are then welded into a unitary mass.

By thus reinforcing the tubular wall 7, its mass, as well as its ability to conduct heat is rendered such that the portion of the casing 4 adjacent to the opening 9 therein is heated to substantially the same temperature as is the tubular member 7 and the sleeve 8. The sleeve 8 may be attached to the tubular member 7 by welding, by a pressed fit, or in any other suitable manner.

In the structure shown in Fig. 2, the opening 9 in the wall 4 is surrounded by a flange 10 which is equal to the sum of the thicknesses of the tubular portion 7 of the radiator unit 5, and that of the sleeve 8. As illustrated in Fig. 2, the sleeve may be within the tubular member 7, which in no manner interferes with its utility.

In Fig. 3, I show a plurality of radiator units 11 disposed in side-by-side relation, the innermost member of which is provided with an outwardly projecting flange member 12 fitting within an annular opening 13 in a coupling member 14. Intermediate the flange member 12 and the surface of the opening 13 is disposed an annular sleeve member 15. The sleeve 15 is attached to the flange 12 in order to reinforce the same prior to placing it within the opening 13. After being assembled, the members 12, 15 and 14 are welded together in a single weld, thus producing an air-tight connection between the units 11 and the coupling member 14.

It will be apparent to those skilled in the art that, by my invention, I have provided a welded joint of novel type and a novel method of making the same whereby a member of any thickness may be successfully welded to a member of any other thickness. Also, it will be apparent that the use of the reinforcing collar, or the plate in welding flat pieces, serves not only to reinforce mechanically the structure composed of thin material, but it also prevents the burning away of the thin material when the welded joint is made.

I claim as my invention:

1. In combination with a transformer tank provided with an opening therein, a transformer radiator provided with a flanged portion disposed within said opening and a sleeve in engagement with said flange portion, said sleeve and said flange portion being both welded to said supporting means, the thickness of said flange portion and said sleeve being substantially equal to that of said supporting means, said sleeve member projecting beyond said common welded connection to reinforce said flanged portion of the radiator.

2. A cooling apparatus comprising a receptacle adapted to contain a fluid to be cooled and having openings provided in the wall portion thereof, and a radiator element provided with tubular projections adapted to extend into said openings to establish communication therebetween, each of said projections being provided with reinforcing sleeve portions adapted to be welded thereto and to the wall of said receptacle adjacent to said openings, said sleeve portions being of such thickness that, when combined with the tubular projections, each of the resulting structures has substantially the same thickness as the wall.

3. A cooling apparatus comprising a receptacle adapted to contain a fluid to be cooled and having a relatively thick wall provided with openings therein and a radiator element provided with tubular projections having relatively thin wall portions adapted to extend into said openings, each of said projections being provided with a reinforcing sleeve having a wall, the thickness of which is substantially equal to the difference between the thickness of the wall of said tubular projection and that of the wall of said receptacle, said sleeve being adapted to be welded to said tubular projection and to the wall of said receptacle to establish communication between said receptacle and said radiator element.

In testimony whereof, I have hereunto subscribed my name this 30th day of November, 1920.

WALTER M. DANN.